US011988373B1

(12) United States Patent
Jiang et al.

(10) Patent No.: US 11,988,373 B1
(45) Date of Patent: May 21, 2024

(54) LIGHT FIXTURE WITH SELF-TEST ABILITY OF SEALING

(71) Applicant: Guangzhou Haoyang Electronic Co., Ltd., Guangzhou (CN)

(72) Inventors: Weikai Jiang, Guangzhou (CN); Jinjian Cai, Guangzhou (CN); Wenfeng Chen, Guangzhou (CN); Qingbi He, Guangzhou (CN); Yinru Peng, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 18/322,066

(22) Filed: May 23, 2023

(30) Foreign Application Priority Data

Mar. 30, 2023 (CN) ........................ 202320673598.5

(51) Int. Cl.
*F21V 31/03* (2006.01)
*F21V 15/01* (2006.01)
*F21V 21/30* (2006.01)
*F21V 23/00* (2015.01)
*F21V 31/00* (2006.01)

(52) U.S. Cl.
CPC .............. *F21V 31/03* (2013.01); *F21V 15/01* (2013.01); *F21V 21/30* (2013.01); *F21V 23/009* (2013.01); *F21V 31/005* (2013.01)

(58) Field of Classification Search
CPC .......... F21V 31/03; F21V 15/01; F21V 21/30; F21V 23/009; F21V 31/005
See application file for complete search history.

(56) References Cited

U.S. PATENT DOCUMENTS

| | | | | |
|---|---|---|---|---|
| 11,060,713 | B2 * | 7/2021 | Jiang | H05K 7/20263 |
| 11,143,392 | B2 * | 10/2021 | Jiang | G08B 21/20 |
| 2006/0126025 | A1 * | 6/2006 | Belliveau | G03B 37/04 353/31 |
| 2014/0119019 | A1 * | 5/2014 | Hsu | F21S 10/007 362/269 |
| 2015/0103553 | A1 * | 4/2015 | Jurik | G02B 6/0096 362/551 |
| 2017/0184288 | A1 * | 6/2017 | Owens | H05B 47/19 |
| 2019/0041291 | A1 * | 2/2019 | Bialik | G01M 3/02 |
| 2021/0095834 | A1 * | 4/2021 | Jiang | F21V 21/15 |

* cited by examiner

*Primary Examiner* — Tsion Tumebo
(74) *Attorney, Agent, or Firm* — MUNCY, GEISSLER, OLDS & LOWE, PC

(57) ABSTRACT

A light fixture with self-test ability of sealing includes a light head with a head housing, a light source for emitting light and generating heat, and a temperature sensor and an air pressure sensor for respectively detecting the temperature and air pressure inside the head housing are provided in the head housing. A controller is further included for determining the sealing performance of the head housing based on the detection results of the temperature sensor and the air pressure sensor. The head housing is provided with a waterproof breathable valve allowing the internal space of the head housing in air communication with the external space of the light fixture. A switch is configured which is capable of switching between two states by unblocking/blocking the waterproof breathable valve to make the internal space of the head housing in air communication with the external space of the light fixture or not.

13 Claims, 4 Drawing Sheets

LIGHT FIXTURE WITH SELF-TEST ABILITY OF SEALING

CROSS REFERENCE TO RELATED APPLICATIONS

The present application claims priorities from Chinese Application No. CN 202320673598.5 filed on Mar. 30, 2023, all of which are hereby incorporated herein by reference.

TECHNICAL FIELD

The present disclosure relates to the technical field of stage light fixtures, in particular to a light fixture with self-test ability of sealing.

BACKGROUND

Generally, in order to adapt to outdoor or specific environment, houses of the light fixtures are designed into sealed structures, such as that the spliced positions of the houses are sealed by waterproof strips or waterproof glue. Accordingly, sealing performance test is required before the light fixture leave the factory or after the house of the light fixture has been maintained. Typically, the method for sealing performance test is to determine the sealing performance by observing the degree of gas leakage, with the house filled a certain amount of gas. However, such method has disadvantages that it is required to conduct sealing performance test one by one before the light fixtures leaving the factory, which is considered as time-consuming and labor-intensive, and it is inconvenient for sealing performance test subsequent to the maintenance after the light fixtures leaving the factory, due to lack of professional test equipment. In addition, during the use of the light fixtures, the sealing performance of the houses of the light fixture may be damaged due to the aging of the sealing strip or waterproof glue, or being hit. While such situation will not be known timely by the.

Therefore, there is a need to provide a light fixture which can be subjected to a sealing performance test at any time, when required, without any external professional test equipment.

SUMMARY

The present disclosure thus provides a light fixture with self-test ability of sealing, which can perform sealing performance test on its own at any time, without any external professional test equipment, having advantages of convenient and fast operation.

According to the present disclosure, the light fixture with self-test ability of sealing includes a light head with a head housing. In the head housing, a light source for emitting light and generating heat, and a temperature sensor and an air pressure sensor for respectively detecting the temperature and air pressure inside the head housing are provided. The light emitted by the light source is projected through the light outlet of the head housing. A controller is further provided for determining the sealing performance of the head housing based on the detection results of the temperature sensor and the air pressure sensor. In the present disclosure, the head housing is provided with a waterproof breathable valve allowing the internal space of the head housing in air communication with the external space of the light fixture. A switch is further configured, which is capable of switching between two states by unblocking/blocking the waterproof breathable valve to make the internal space of the head housing in air communication with the external space of the light fixture or not.

During normal operation, the switch of the light head is switched to make the internal space of the head housing in air communicate with the external space of the light fixture to ensure that the air pressure inside the head housing is balanced with the air pressure outside the light fixture, thereby avoiding damage of the sealing performance of the head housing caused by the air pressure change due to increase or decrease of the temperature inside the head housing. While during sealing performance test, the switch is switched to make the internal space of the head housing not in air communicate with the external space of the light fixture. In this case, heat energy generated by the light source will increase the air pressure inside the head housing. According to the temperature and air pressure inside the head housing detected by the temperature sensor and the air pressure sensor, the sealing performance of the head housing thus can be determined by the associated controller.

According to the present disclosure, in order to exhibit different effects by the light projected through the light outlet of the light head, such as light projected with different divergence angle, brightness, color, shape, and the like, an effect assembly for receiving the light emitted by the light source and generating a light effect is further provided inside the head housing.

To reduce the light projected through the light outlet during the sealing performance test and thus gather the light emitted by the light source in the head housing, a light shielding member for intercepting the light emitted by the light source can be provided. In such configuration, the temperature inside of the head housing will increase with the light absorbed by the light shielding member or other components inside of the head housing. The efficiency of heating the inside of the head housing thus will be improved in such easy way. As a result, the sealing performance test can be completed in a fraction of the time, achieving time saving in an easy way.

A support arm for supporting the light head to rotate, and a base for supporting the support arm may be further included. The base has a base housing. Accordingly, the light head can rotate relative to the support arm, so that the light emitted by the light source can be projected in multiple directions.

According to the present disclosure, similar to the head housing, the base housing may be also provided with a sealing self-test system. In such configuration, the base further includes a switching mode power supply arranged inside the base housing for supplying power and generating heat, and a temperature sensor and an air pressure sensor for respectively detecting the temperature and air pressure inside the base housing. The base housing is provided with a waterproof breathable valve allowing the internal space of the base housing in air communication with the external space of the light fixture. A switch is further provided, which can be switched between two states by unblocking/blocking the waterproof breathable valve to make the internal space of the base housing in air communication with the external space of the light fixture, or not in air communication with the external space of the light fixture. Another associated controller may be provided to determine sealing performance of the head housing based on detection results of the temperature sensor and the air pressure sensor of the base housing. However, the sealing self-test system in the base housing and the head housing can share one common controller.

In this situation, during normal operation of the light fixture, the switch of the base housing is switched to make the internal space of the base housing in air communication with the external space of the light fixture, namely the waterproof breathable valve of the base housing is not blocked, to ensure that the air pressure inside the base housing is balanced with the air pressure outside the light fixture, thereby avoiding damage of the sealing performance of the base housing caused by the air pressure change due to the increase or decrease of the temperature inside the base housing. While during sealing performance test, the switch is switched to make the internal space of the base housing not in air communication with the external space of the light fixture, namely the waterproof breathable valve of the base housing is blocked. In this case, heat energy generated by the switching mode power supply will make the air pressure inside the base housing increase. The sealing performance of the base housing thus can be determined by the associated controller, according to the temperature and air pressure inside the base housing detected by the temperature sensor and the air pressure sensor.

In a bid to facilitate passing of a power transmission cable and a signal transmission cable between the light head and the base, while without any damage to the sealing performance of the head housing and the base housing, a pipeline is configured to communicate the head housing with the base housing, with joints therebetween sealed.

The pipeline may be provided with a blocking device for selectively blocking the mutual air flow between the head housing and the base housing. With the mutual air flow between the head housing and the base housing blocked, the light head and the base can be independent of each other, making the temperature and air pressure therein do not affect each other, thus avoiding affecting the respective determination results of the sealing performance of the head housing or the casing housing in the sealing test. Therefore, individual sealing performance test for the head housing and the base housing can be achieved simultaneously.

According to a preferred embodiment, for the situation of taking the head housing and the base housing as a whole system, in order to achieve sealing performance test of the whole system, a temperature control system for synchronously increasing the temperature inside the head housing and the base housing is further included. The temperature control system can coordinately control the temperature inside the head housing and the base housing to keep the temperature therein consistent, thus avoiding temperature asynchronous due to mutual influence of air pressure of the head housing and the base housing, such temperature asynchronous may result in inaccurate determination on the sealing performance of the whole system.

Additionally, a heat homogenizing assembly may be provided in the head housing or the base housing, which can make the temperature inside the head housing or the base housing consistent in every position, forming the system more conforming to an ideal gas state equation.

For increasing the heating rate during the sealing formation test, an auxiliary heating assembly may be further provided in the head housing or the base housing.

The switch is preferably in form of an electromagnetic valve, which is connected with the waterproof breathable valve via an air guide pipe.

DETAILED DESCRIPTION

Figure 1:
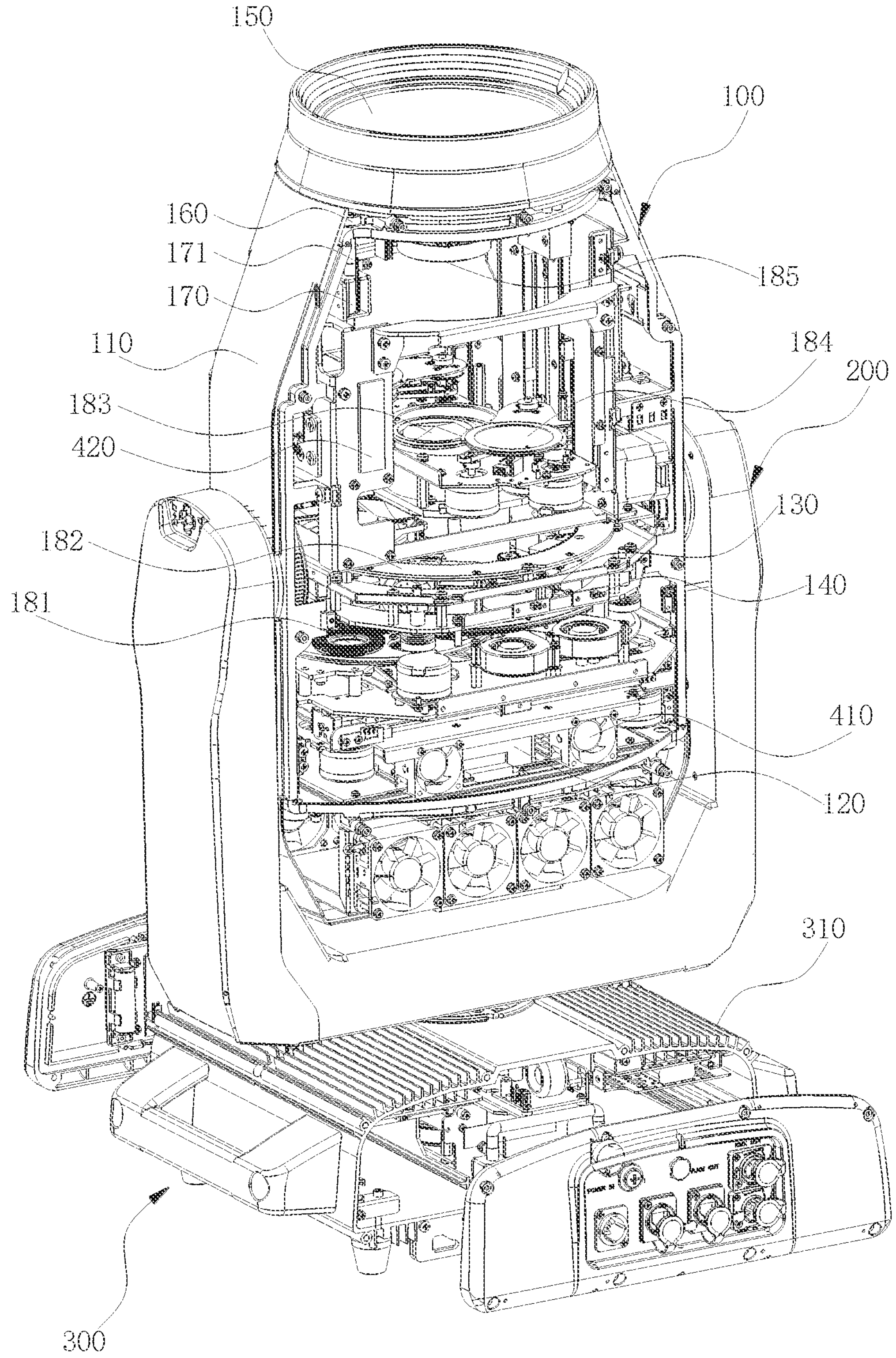
FIG. 1 is a schematic view of a light fixture according to an embodiment of the present disclosure, especially showing an internal structure of a light head of the light fixture.

The accompanying drawings are for exemplary illustration only, and should not be construed as limitations on this disclosure; in order to better illustrate this embodiment, some parts in the accompanying drawings may be omitted, enlarged or reduced, and they do not represent the size of the actual product; for those skilled in the art, it is understandable that certain well-known structures and descriptions thereof in the drawings may be omitted. The positional relationship described in the drawings is only for exemplary illustration, and should not be construed as limitations on this disclosure.

Figure 4:
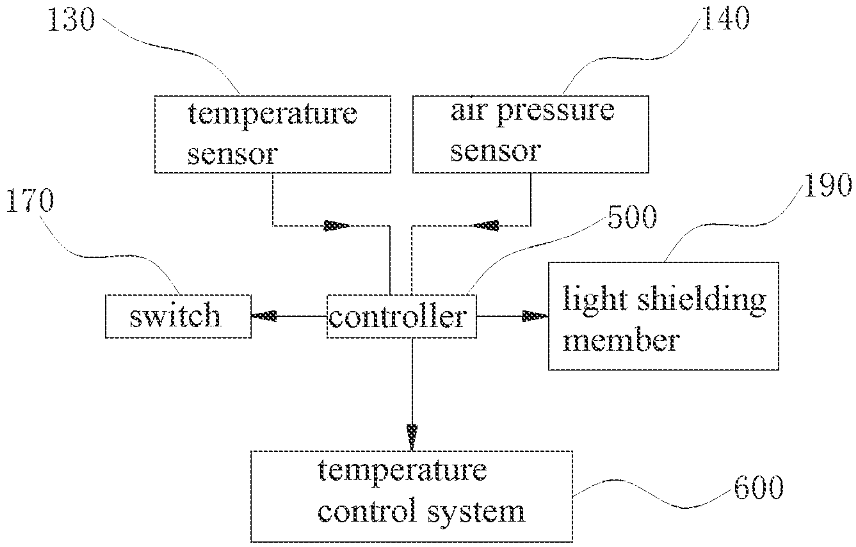
FIG. 4 is a diagram showing a signal control flow according to an embodiment of the present disclosure.

FIG. 1 depicts a light fixture with self-test ability of sealing, in which a light head of the light fixture is provided with a sealing self-test system. The light fixture in this embodiment includes a light head 100 having a head housing 110. A light source 120 for emitting light and generating heat, and a temperature sensor 130 and an air pressure sensor 140 for respectively detecting the temperature and air pressure inside the head housing 110 are provided in the head housing 110. A controller 500, as shown in FIG. 4, is further provided for determining the sealing performance of the head housing 110 based on the detection results of the temperature sensor 130 and the air pressure sensor 140. The light emitted by the light source 120 is projected through a light outlet 150 of the head housing 110. In the present embodiment, the head housing 110 is provided with a waterproof breathable valve 160 allowing the internal space of the head housing 110 in air communication with the external space of the light fixture. A switch 170 is further provided, which is capable of switching between two states by unblocking/blocking the waterproof breathable valve to make the internal space of the head housing 110 in air communicating with the external space of the light fixture or not.

Referring to FIG. 4, the switch 170 can be controlled by the controller 500. According to the present embodiment, during normal operation, the switch 170 of the light head 100 is switched by the controller 500 to make the internal space of the head housing 110 in air communication with the external space of the light fixture, namely the waterproof breathable valve is not blocked, to ensure that the air pressure inside the head housing 110 is balanced with the air pressure outside the light fixture, thereby avoiding damage of the sealing performance of the head housing 110 caused by the air pressure change due to the increase or decrease of the temperature inside the head housing 110. While during testing of the sealing performance, the switch 170 is switched by the controller 500 to make the internal space of the head housing 110 not in air communication with the external space of the light fixture. In this case, heat energy generated by the light source 120 (the light source 120 generates a large amount of heat when emitting light) will make the air pressure inside the head housing 110 increase. According to the temperature and air pressure inside the head housing 110 detected by the temperature sensor 130 and the air pressure sensor 140, the associated controller 500 thus can determine the sealing performance of the head housing 110.

It should be noted that the situation, that the internal space of the head housing 110 is not in air communication with the external space of the light fixture, is not limited to the internal space of the head housing 110 being a single isolated whole, which may include that the head housing 110 may be communicated with other components in the light fixture as long as the component can be not in air communication with the outside space thereof. It should be further known that the waterproof breathable valve 160 can prevent water from entering the inside of the head housing 110, but does not affect air to get in or out of the head housing 110.

According to the text of the present disclosure, the sealing performance of the head housing 110 can be determined, according to the temperature and air pressure inside the head housing 110 detected by the temperature sensor 130 and the air pressure sensor 140, by detecting whether the air pressure change of the internal space of the head housing 110 is linear as the temperature increases or decreases, or by detecting the air pressure fluctuation in a constant temperature condition.

However, it is preferable to determine the sealing performance by detecting whether the air pressure change of the internal space of the head housing 110 is linear as the temperature rises, within a certain temperature range.

In the present embodiment, the switch 170 is arranged inside the head housing 110.

The temperature sensor 130 may be located at the end of the head housing 110 away from the light source 120.

In a preferred embodiment of the present disclosure, in combination with FIG. 4, an effect assembly for receiving the light emitted by the light source 120 and generating a light effect is further provided inside the head housing 110. With the configuration of the effect assembly, the light projected through the light outlet 150 of the light head 100 can exhibit different effects, such as light with different divergence angle, brightness, color, shape, and the like. Such effect assembly can be one or more of a blade module, a color filter module, a pattern sheet module 181, a color sheet module, a shading module 182, a focusing module, a prism module 183, a light homogenizing module 184, or an amplification module 185, which are all common components in the art and will not be described in detail in this disclosure.

According to a preferred embodiment of the present disclosure, in combination with FIG. 4, in order to improve the efficiency of heating the inside of the head housing 110 during sealing performance test, a light shielding member 190 for intercepting the light emitted from the light source 120 is further provided inside the head housing 110. With reference to FIG. 4, the light shielding member 190 can be, but not limited to, controlled by the controller 500. With the light shielding member 190, the light projected through the light outlet 150 can be reduced during the test, so that the light is gathered inside the head housing 110, the temperature inside of the head housing 110 thus can be increased with the light absorbed by the light shielding member 190 or other components inside of the head housing 110. In such an easy way, the efficiency of heating the inside of the head housing 110 is accordingly improved. As a result, the sealing performance test can be completed in a fraction of the time, achieving time saving in an easy way.

It should be noted that the light shielding member 190 may be additionally provided, or may be the existing effect assembly, such as the blade module, the color filter module, the pattern sheet module 181, the color sheet module, the shading module 182, the focusing module, the prism module 183, the light homogenizing module 184 or the amplification module 185, as long as the light emitted from the light outlet 150 can be reduced to improve efficiency of heating the inside of the head housing 110 during sealing performance test. For example, the blade module, the pattern sheet module 181 and the shading module 182 can directly shield light to reduce light projected; the color filter module and the color sheet module can reduce the brightness of light projected to improve efficiency of heating; the focusing module, the prism module 183, the light homogenizing module 184, and the amplification module 185 can increase the beam divergence angle to disperse the light projected, and thus reduce the light emitted from the light outlet 150 with less light projected through the light outlet.

As shown in FIG. 1, a support arm 200 for supporting the light head 100 to rotate, and a base 300 for supporting the support arm 200 are further included. The base 300 has a base housing 310. The light head 100 in such case thus can rotate relative to the support arm 200 to allow the light projected in multiple directions.

The support arm 200 can also be capable of rotating relative to the base 300 in other embodiments of the present disclosure.

Figure 2:
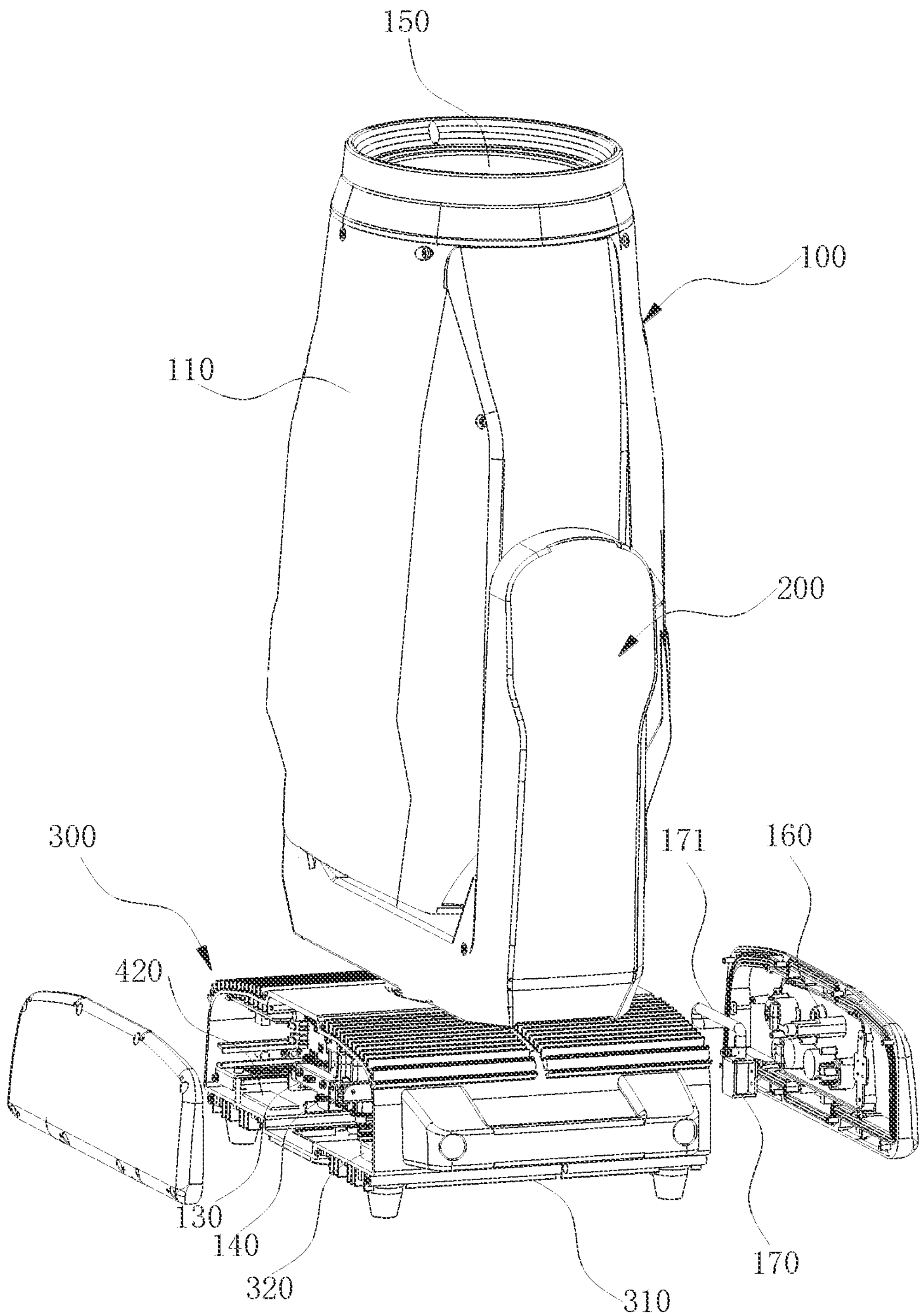
FIG. 2 is a schematic view of a light fixture according to an embodiment of the present disclosure, especially showing an internal structure of a base of the light fixture.

FIG. 2 shows the base housing 310 is also provided with a sealing self-test system, similar to the head housing shown in FIG. 1. In this embodiment, the base 300 further includes a switching mode power supply 320 arranged inside the base housing 310 for supplying power and generating heat, and a temperature sensor 130 and an air pressure sensor 140 for respectively detecting the temperature and air pressure inside the base housing 310. The base housing 310 is provided with a waterproof breathable valve 160 allowing the internal space of the base housing 310 in air communication with the external space of the light fixture. A switch 170 is further provided for selectively blocking the waterproof breathable valve 160, which is capable of switching between two states by unblocking/blocking the waterproof breathable valve 160 to make the internal space of the base housing 310 in communicating with the external space of the light fixture or not in communicating with the external space of the light fixture.

According to the this embodiment, during normal operation of the light fixture, the switch 170 of the base 300 is switched make the internal space of the base housing 310 in air communication with the external space of the light fixture, namely the waterproof breathable valve of the base housing 310 is not blocked, to ensure that the air pressure inside the base housing 310 is balanced with the air pressure outside the light fixture, thereby avoiding damage of the sealing performance of the base housing 310 caused by the air pressure change due to the increase or decrease of the temperature inside the base housing 310. While during the sealing performance test of the base housing 310, the switch 170 is switched to make the internal space of the base housing 310 in air communication with the external space of the light fixture, namely the waterproof breathable valve of the base housing is blocked. In this case, heat energy generated by the switching mode power supply 320 (the switching mode power supply 320 generates a large amount of heat during operating) will make the air pressure inside the base housing 310 increase. As FIG. 4 shown, according to the temperature and air pressure inside the base housing 310 detected by the temperature sensor 130 and the air pressure sensor 140, the associated controller 500 thus can determine the sealing performance of the base housing 310.

It should be noted that the situation, that the internal space of the base housing 310 is not in air communication with the external space of the light fixture, is not limited to the internal space of the base housing 310 being a single isolated whole, which may include that the base housing 310 may be communicated with other components in the light fixture as long as the component can be not in air communication with the outside space thereof. It should be further known that the waterproof breathable valve 160 can prevent water from entering the inside of the base housing 310, but does not affect air to get in or out of the base housing 310.

Figure 3:
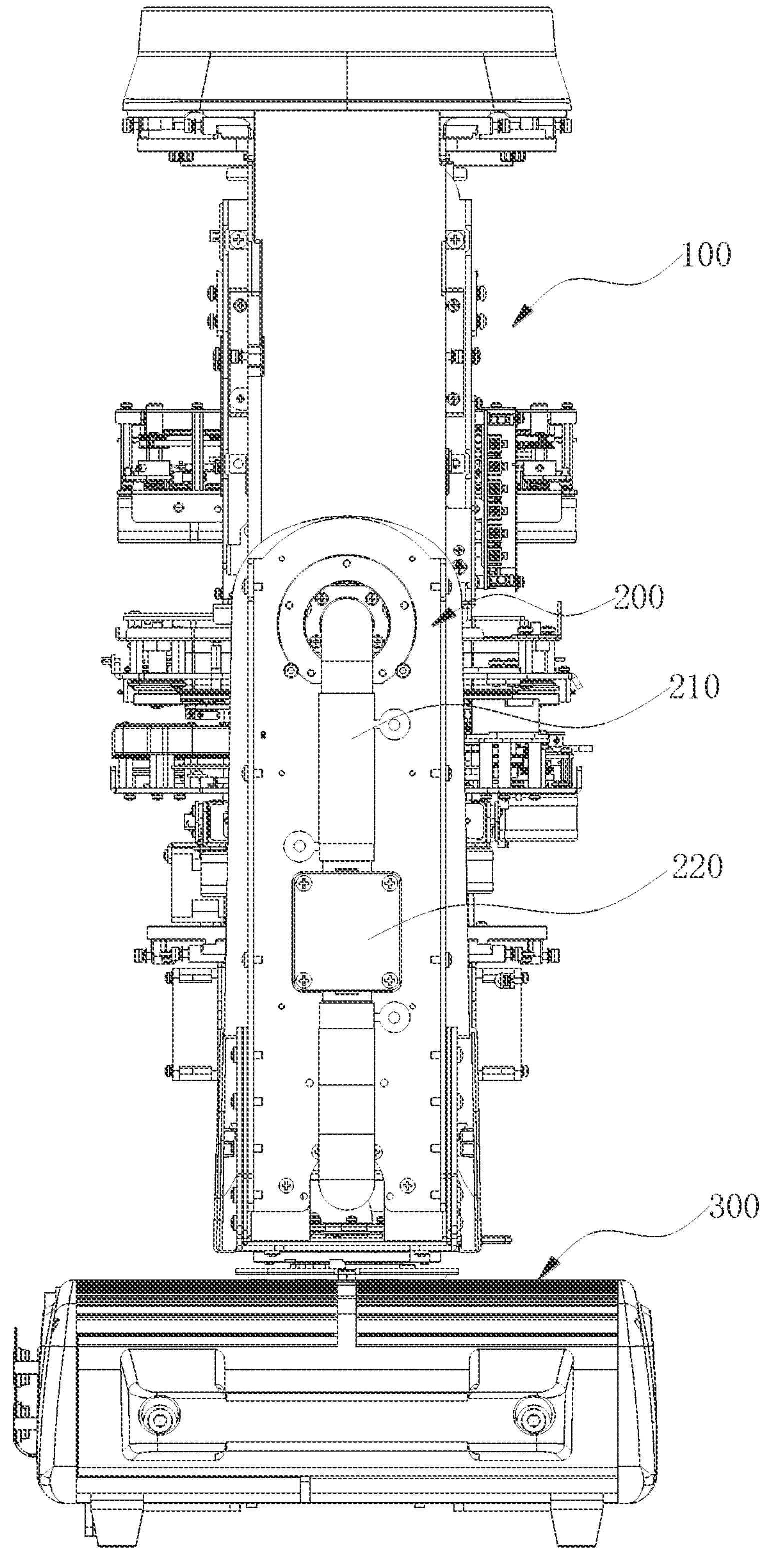
FIG. 3 is a view showing the head housing communicated with the base housing via a pipeline according to an embodiment of the present disclosure.

As in FIG. 3, in this embodiment, the head housing 110 is communicated with the base housing 310 via a pipeline 210, with the joints therebetween sealed. Such configuration facilitates the passage of a power transmission cable and a signal transmission cable between the light head 100 and the base 300, while without damage to the sealing performance of the head housing 110 and the base housing 310.

In this embodiment, the head housing 110 and the base housing 310 are individually joined with the pipeline 210 by rotatable sealed couplings, such as a conventional oil seal, that is, such coupling can achieve relative rotation, while without air leak.

Additionally, according to a preferred embodiment of the present disclosure, the pipeline 210 is provided with a blocking device 220 for selectively blocking the mutual air flow between the head housing 110 and the base housing 310. With the configuration of the blocking device 220, the mutual air flow between the head housing 110 and the base housing 310 can be blocked, so that the light head 100 and the base 300 can be independent of each other, making the temperature and air pressure therein not affect each other to avoid affecting the respective determination results of the sealing performance of the head housing 110 or the casing housing 310 in the sealing test.

The blocking device 220 may be a sealing plug with a wire hole, or an electromagnetic valve.

According to a preferred embodiment of the present disclosure, in combination with FIG. 4, a temperature control system 600 for synchronously increasing the temperature inside the head housing 110 and the base housing 310 is further provided. For the situation of taking the head housing and the base housing as a whole system, in order to conduct sealing testing of the whole system, the temperature control system 600 is configured to coordinately control the temperature inside the head housing 110 and the base housing 310 to keep the temperature therein consistent, thus avoiding temperature asynchronous due to mutual influence of air pressure of the head housing and the base housing, such temperature asynchronous may result in inaccurate determination, according to the temperature and air pressure on the sealing performance of the whole system. With reference to FIG. 4, the temperature control system can be, but not limited to, controlled by the controller 500.

Particularly, in a case that the base housing 310 is not provided with the sealing self-test assembly, including the temperature sensor 130, the air pressure sensor 140, and a heating member, the temperature control system 600 is in form of a flow-promoting device, such as a fan, provided to the pipeline 210 to promote the mutual air flow inside the head housing 110 and the base housing 310. The temperature inside the head housing 110 and the base housing 310 thus can be kept consistent by promoting the mutual air flow inside the head housing 110 and the base housing 310 via the flow-promoting device.

In a case that the base housing 310 is provided with the sealing self-test assembly, including the temperature sensor 130, the air pressure sensor 140, and a heating member, the temperature control system 600 includes a microprocessor (which may be replaced by a controller) that coordinates the heating power of heating elements inside the head housing 110 and the base housing 310, and the temperature sensor 130. In such configuration, the temperature detected by the temperature sensor 130 can synchronously increase by controlling the heating power of the respective heating elements, thus achieving both synchronously change of the temperature and air pressure inside the head housing 110 and the base housing 310.

Referring back to FIG. 1, according to a preferred embodiment of the present disclosure, a heat homogenizing assembly is further provided in the head housing 110 or the base housing 310. The heat homogenizing assembly can make the temperature inside the head housing 110 or the base housing 310 consistent in every position, as such situation is more conforming to an ideal gas state equation.

The heat homogenizing assembly may be a fan 410 or a heat conducting member, such as cooling fins or a heat transfer mesh.

According to a preferred embodiment of the present disclosure, in order to increase the heating rate, an auxiliary heating assembly 420 is further provided in the head housing 110 or the base housing 310.

The auxiliary heating assembly 420 can arrange at the end of the head housing 110 away from the light source 120, or at the end of the base housing 310 away from the switching mode power supply 320. Such configuration facilitates heating more uniform.

The switch 170 is preferably in form of an electromagnetic valve which is connected with the waterproof breathable valve 160 through an air guide pipe 171.

The electromagnetic valve generally has an air inlet and an air outlet. The air guide pipe 171 is connected to the air inlet, and the air outlet is exposed outside of the system.

Obviously, the above-mentioned embodiments of the present disclosure are only examples for clearly illustrating the present disclosure, rather than limiting the implementation modes of the present disclosure. For those of ordinary skill in the art, changes or modifications in other different forms can also be made on the basis of the above description. It is not needed and it is impossible to list all implementation modes here. Any modifications, equivalent replacements and improvements made within the spirit and principles of the present disclosure shall be included within the protection scope of the claims of the present disclosure.

The invention claimed is:

1. A light fixture with self-test ability of sealing, comprising a light head having a head housing; a light source for emitting light and generating heat, which is arranged in the head housing, the light emitted by the light source being projected through a light outlet of the head housing; a temperature sensor and an air pressure sensor for respectively detecting temperature and air pressure inside the head housing, which are arranged in the head housing; and a controller configured to determine sealing performance of the head housing based on detection results of the temperature sensor and the air pressure sensor, wherein the head housing is provided with a waterproof breathable valve allowing an internal space of the head housing in air communication with an external space of the light fixture;

and a switch is further provided, which is configured to make the internal space of the head housing in air communication with the external space of the light fixture by unblocking the waterproof breathable valve when the light fixture is in normal operation, so as to keep air pressure balance between inside and outside of the head housing, and configured to make the internal space of the head housing not in air communication with the external space of the light fixture by blocking the waterproof breathable valve when the light fixture is in testing of sealing performance.

2. The light fixture according to claim 1, wherein an effect assembly is further provided inside the head housing, which is configured to receive the light emitted by the light source and generate a light effect.

3. The light fixture according to claim 1, wherein a light shielding member for intercepting the light emitted by the light source is provided to improve efficiency of heating the inside of the head housing when the internal space of the head housing is isolated from the external space of the light fixture.

4. The light fixture according to claim 1, further comprising a support arm for supporting the light head to rotate, and a base for supporting the support arm, the base having a base housing.

5. The light fixture according to claim 4, wherein the base further comprises a switching mode power supply arranged inside the base housing for supplying power and generating heat; and an additional temperature sensor and an additional air pressure sensor for respectively detecting the temperature and air pressure inside the base housing, wherein the base housing is provided with an additional waterproof breathable valve allowing an internal space of the base housing in air communication with the external space of the light fixture; and a switch is further provided, which is capable of switching between two states by unblocking/blocking the additional waterproof breathable valve to make the internal space of the base housing in air communication with the external space of the light fixture or not.

6. The light fixture according to claim 4, wherein a pipeline is configured to communicate the head housing with the base housing, with a joint therebetween sealed.

7. The light fixture according to claim 6, wherein the pipeline is provided with a blocking device for selectively blocking mutual air flow between the head housing and the base housing.

8. The light fixture according to claim 6, further comprising a temperature control system for synchronously increasing the temperature inside the head housing and the base housing.

9. The light fixture according to claim 1, wherein a heat homogenizing assembly is further provided in the head housing.

10. The light fixture according to claim 1, wherein an auxiliary heating assembly is further provided in the head housing.

11. The light fixture according to claim 1, wherein the switch is in form of an electromagnetic valve.

12. The light fixture according to claim 5, wherein a heat homogenizing assembly is further provided in the base housing.

13. The light fixture according to claim 5, wherein an auxiliary heating assembly is further provided in the base housing.

* * * * *